United States Patent Office

3,418,255
Patented Dec. 24, 1968

3,418,255
METHOD OF PRODUCING CONCENTRATED SOLUTIONS OF MIXED AMMONIUM SALTS OF BORIC, PHOSPHORIC AND SULFURIC ACIDS
Marion L. Brown, Jr., Albert W. Green, and Elmer L. Blanton, Yazoo City, Miss., assignors to Mississippi Chemical Corporation, Yazoo City, Miss., a corporation of Mississippi
No Drawing. Continuation-in-part of application Ser. No. 588,754, Oct. 24, 1966, now Patent No. 3,317,276. This application Apr. 28, 1967, Ser. No. 634,495
8 Claims. (Cl. 252—397)

ABSTRACT OF THE DISCLOSURE

Mixture of concentrated sulfuric and phosphoric acids is converted with ammonia to their ammonium salts; boric acid is added; and additional ammonia is added to convert most or all of the phosphoric acid to diammonium phosphate.

This is a continuation-in-part application of application S.N. 588 754, filed Oct. 24, 1966, now U.S. Patent No. 3,317,276.

This invention relates to a method of producing concentrated solutions of a mixture of the ammonium salts of boric, phosphoric and sulfuric acids, more particularly by the addition of boric acid to a concentrated solution of ammonium salts of phosphoric and sulfuric acids, free from phosphoric acid, followed by the addition of sufficient ammonia to produce a final solution in which at least most of the ammonium phosphate is diammonium phosphate.

Background of invention

In U.S. 3,317,276 there is disclosed and claimed a method of reducing the sensitivity of ammonium nitrate to II–IV and III–IV crystal transitions using a mixture of the ammonium salts of boric, phosphoric and sulfuric acids. This can be accomplished on a laboratory, pilot or commercial scale by dissolving the ammonium salts of these acids, separately or as a mixture, in water. However, such solutions are relatively dilute and thus increase undesirably the load on the evaporators in an ammonium nitrate plant. Since the capacity of an ammonium nitrate plant may be determined by the capacity of its evaporators, this is an undesirable aspect of the process from a commercial point of view. In a high density plant, the water in such a dilute solution might preclude its use.

A method of reducing the water in the stabilizing mixture in a commercially feasible manner could not readily be achieved. Obviously, evaporating a more dilute solution would produce the same problem of evaporator capacity and, in fact, would be expensive and require additional equipment. A dry mixture of the ammonium salts cannot readily be distributed uniformly in the hot ammonium nitrate and also tends to foul the prilling orifices. Ammonia cannot be added to a mixture of all three free acids because of the insoluble precipitates which form. The same problem arises if sulfuric acid and boric acid are first converted to their ammonium salts and phosphoric acid added to the resulting mixture. Formation of ammonium phosphate separately requires an additional pump and ancillary equipment. Virtually all attempts to produce a reasonably concentrated mixture of the mixed ammonium salts in which most of the phosphoric acid was present as monoammonium phosphate resulted in a slurry of precipitated solids which was difficult to handle and maintain in a homogeneous state. Also, many of the solutions which were formed precipitated some of the solids on standing, even at very high temperature, e.g., 160–190° C.

Objects of invention

It is an object of this invention to provide a method for producing concentrated solutions of the ammonium salts of a mixture of boric, phosphoric and sulfuric acid. Other objects will be apparent to those skilled in the art to which the invention pertains.

Description of the invention

The following is a description of the manner of making and using and the best mode contemplated of carrying out the invention.

The process involves the addition of boric acid to a concentrated solution, free from phosphoric acid, of a mixture of the ammonium salts of phosphoric and sulfuric acids. The solution preferably contains less than 55 percent water, e.g., from 30 to 50 percent, and the weight ratio of ammonium salt of phosphoric acid to ammonium salt of sulfuric acid is at least 5:1, e.g., up to 100:1 or higher but preferably from 10:1 to 30:1.

Such a solution is preferably prepared by ammoniation, preferably with anhydrous but optionally with aqueous ammonia, of a mixture of phosphoric and sulfuric acids. Preferably sufficient ammonia is added so that a portion, e.g., 25 percent and desirably from 30–80 percent, of the phosphoric acid is converted to diammonium phosphate, to ensure that no free phosphoric acid is present in the mixture when the boric acid is added. The water content of the acid mixture is preferably less than 55 percent and more preferably 30 to 50 percent. If aqueous ammonia is used, the acids should be of correspondingly higher concentration so that the water content of the final solution is less than 55 percent. Cooling means should be provided to maintain the temperature of the solution below 190° F. The weight ratio of phosphoric acid to sulfuric acid in the mixture of starting acids is at least 5:1, e.g., up to 100:1 or higher but preferably from 10:1 to 30:1.

The ammonia is preferably bubbled well below the surface of the mixture of acids, which should be well stirred during the addition, thereby minimizing any ammonia losses. The amount which should be added can be determined on a weight basis; by the pH of the solution, which should be at least about 4 but no more than 8; or by the odor of ammonia, which tends to build up after all the phosphoric acid has been converted to monoammonium phosphate. The precise amount of ammonia which has been added can be calculated by adding at least enough ammonia to convert all the free acid to ammonium salts, withdrawing an aliquot sample, determining the amount of standard acid required to bring the pH to 4 and then the amount of standard base required to bring the pH to 8. The proportion of the added acid to base is the proportion of phosphoric acid present as diammonium phosphate.

It will be apparent the amount of ammonia which must be added is influenced by the amount of sulfuric acid present in the mixture. However, in the preferred mixtures, only about 1/10 to 1/30 as much sulfuric acid is present as phosphoric acid, so it has a relatively small effect upon the total amount of ammonia added.

Boric acid is added to the solution of mixed ammonium salts in a weight proportion of at least 5:1 based on the sulfuric acid, e.g., up to 100:1 or higher but preferably from 10:1 to 30:1. Desirably, the molar ratio of boric acid to phosphoric acid is from about 0.5:1 to 2:1, preferably 0.5:1 to 1.1:1.

The boric acid can be added as solid, e.g., crystals or powder, or as a hot concentrated aqueous solution. Powdered boric acid is preferred. As in the preceding step, the mixture should be thoroughly stirred; the temperature kept below 190° F. Care should be taken to ensure the boric acid is unformly distributed without lumping in the solution. If aqueous boric acid is used, preferably the amount of water thus added to the mixture is no more than that required to maintain the total moisture content of the solution below 55 percent.

In the next step, ammonia is added, in the manner described above, in an amount such that most, e.g., at least 70 percent and preferably at least 80 percent of the phosphoric acid is present as diammonium phosphate. Such solutions have much lower freezing points than corresponding solutions of the same concentration in which less than 70 percent of the ammonium phosphate is in the form of diammonium phosphate. The amount which should be added can be determined in the same manner as described above. The pH of the solution should be about 7 to 8. Thus, all acid present in the mixture is in the form of ammonium salts thereof.

The resulting solution has a relatively low freezing point, e.g., 60 to 130° F. It can be pumped into ammonium nitrate plants by means of proportioning pumps or other methods. The solution can be fed into ammonium nitrate solution or melt at one of the following several points:

(A) Into the melt or solution in the pipeline leading to the prilling sprays;

(B) Into the pump suction tanks which feed the prilling towers;

(C) Into the solution feeding to the evaporators;

(D) Into head tanks which feed to prilling tower sprays; and (E) Into ammonium nitrate-ammonia-water solutions used in granulation of complete fertilizers.

It will be apparent to those familiar with the art there are also other possible points of introducing the additive batch mixture into the ammonium nitrate.

Example

Add 3400 pounds of water to a batch weigh tank. Start mechanical agitation of the water. Add 2230 pounds of phosphoric acid (75 percent $H_3PO_4$) to the batch weigh tank followed by 106 pounds of sulfuric acid (98.0 percent $H_2SO_4$). Add anhydrous ammonia to the solution in the tank until the molar ratio of $NH_3$ to $H_3PO_4$ of 1.3 (or higher) is obtained. This ought require about 414 pounds of ammonia based on all the sulfuric acid being converted to diammonium sulfate and 30 percent of the phosphoric acid being converted to diamomnium phosphate. The molar ratio of the batch can be checked by conventional laboratory titration procedure, e.g., back titrate an aliquot sample with standard acid to pH 4 and then to pH 8 with standard base. Add 2000 pounds of boric acid (powdered form) to the batch tank. Next, add ammonia to the batch solution to bring the molar ratio of $NH_3$ to $H_3PO_4$ to 1.8–2.0. This ought require about 284 to 340 pounds anhydrous ammonia, based on all the boric acid being converted to ammonium salt and all the phosphoric acid to diammonium phosphate. Final pH should be about 8. Maintain the temperature in the batch tank at no greater than 190° F. at all times. The batch, which is about 60–65 percent solids, can then be agitated until used in the plant. It is quite fluid at 70° F. and can be stored for long periods of time.

With a proportioning pump, pump the resulting solution to molten ammonium nitrate at the prilling tower of a high density nitrate plant at a rate of about ten pounds per ton of ammonium nitrate, which incorporates about 0.2 percent diammonium phosphate, about 0.01 percent diammonium sulfate and about 0.18 percent boric acid (equiv.) into the ammonium nitrate. Prill in the conventional manner.

The following table illustrates the marked increase in freezing point of mixtures of ammonium salts of boric, sulfuric acid when the $NH_3:H_3PO_4$ ratio is less than 1.7, i.e., when less than 70 percent of the ammonium phosphate is in the form of diammonium phosphate.

| Percent $H_3BO_3$ (equiv.) | Percent DAS [1] | Percent DAP/MAP [2] | Percent $H_2O$ | Mole Ratio $NH_3/H_3PO_4$ | Freezing Point, ° F. |
| --- | --- | --- | --- | --- | --- |
| 19.6 | 2.2 | 31.7 | 46.5 | 2.01 | 60 |
| 30.3 | 2.0 | 30.3 | 32.4 | 1.71 | 115 |
| 33.0 | 1.75 | 30.8 | 33.0 | 1.24 | 171 |
| 30.2 | 3.2 | 32.9 | 33.7 | 1.64 | 168 |

[1] Diammonium sulfate.
[2] Diammonium phosphate/monoammonium phosphate.

The above solutions can also be pumped to the prilling tower of a low density plant or to the granulating equipment of a mixed fertilizer plant.

What is claimed is:

1. A method of producing a concentrated aqueous solution of the mixed ammonium salts of boric, phosphoric and sulfuric acids which comprises the steps of
   (a) adding boric acid to an aqueous solution of at least 50 percent concentration of the ammonium salts of phosphoric and sulfuric acids, free from phosphoric acid, in which the weight ratio of the ammonium salt of phosphoric acid to ammonium salt of sulfuric acid is at least 5 to 1, in a weight ratio of boric acid to the ammonium salt of sulfuric acid of at least 5 to 1; and
   (b) then adding an amount of ammonia such that at least the major portion of the ammonium salt of phosphoric acid is diammonium phosphate.

2. A method according to claim 1 wherein anhydrous ammonia is employed and the starting solution of mixed ammonium salts has a water content of from 30 to 50 percent.

3. A method according to claim 1 wherein at least a portion of the ammonium salt of phosphoric acid in the solution to which the boric acid is added is diammonium phosphate.

4. A method according to claim 1 which includes the step of forming the starting solution of mixed ammonium salts by adding ammonia to a mixture of phosphoric and sulfuric acids of a weight ratio of at least 5 to 1 and of a water content of less than 50 percent until the solution is free of phosphoric acid.

5. A method according to claim 4 wherein the ratios of the boric acid and of the phosphoric acid to the sulfuric acid both are from 10 to 1 to 30 to 1.

6. A method according to claim 4 wherein sufficient ammonia is added to the starting mixture of phosphoric and sulfuric acids to convert at least 30 percent of the phosphoric acid to diammonium phosphate.

7. A method according to claim 4 wherein the amount of ammonia added following the boric acid is such that at least 80 percent of the ammonium salt of phosporic acid is diammonium phosphate.

8. A method according to claim 5 wherein
   (a) anhydrous ammonia is employed and the starting solution of mixed ammonium salts has a water content of from 30 to 50 percent;
   (b) the boric acid is added as a powder;
   (c) sufficient ammonia is added to the starting mixture of phosphoric and sulfuric acids to convert at least 30 percent of the phosphoric acid to diammonium phosphate; and
   (d) the amount of ammonia added following the boric acid is such that at least 80 percent of the ammonium salt of phosphoric acid is diammonium phosphate.

(References on following page)

References Cited

UNITED STATES PATENTS 2,657,977 11/1953 Stengel et al. _____ 71—59 X
2,902,342 9/1959 Kerley _____ 71—59 X LEON D. ROSDOL, *Primary Examiner.*
I. GLUCK, *Assistant Examiner.*

U.S. Cl. X.R.
23—103, 107; 71—43, 59